US011200571B2

(12) United States Patent
Chamberot et al.

(10) Patent No.: US 11,200,571 B2
(45) Date of Patent: Dec. 14, 2021

(54) METHOD OF CONTROLLING AN ELECTRONIC DEVICE AND CORRESPONDING ELECTRONIC DEVICE

(71) Applicant: IDEMIA FRANCE, Colombes (FR)

(72) Inventors: Francis Chamberot, Colombes (FR); Marco De Oliveira, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 399 days.

(21) Appl. No.: 15/696,215

(22) Filed: Sep. 6, 2017

(65) Prior Publication Data
US 2018/0068307 A1 Mar. 8, 2018

(30) Foreign Application Priority Data
Sep. 6, 2016 (FR) ...................................... 1658266

(51) Int. Cl.
| *G06Q 20/40* | (2012.01) |
| *G06Q 20/34* | (2012.01) |
| *G07F 7/10* | (2006.01) |
| *G07F 7/12* | (2006.01) |
| *G06Q 20/24* | (2012.01) |

(52) U.S. Cl.
CPC ............ *G06Q 20/40* (2013.01); *G06Q 20/24* (2013.01); *G06Q 20/341* (2013.01); *G06Q 20/3552* (2013.01); *G07F 7/1008* (2013.01); *G07F 7/127* (2013.01)

(58) Field of Classification Search
CPC ............................... G06Q 20/40; G06Q 20/24
USPC ......................................................... 705/44
See application file for complete search history.

(56) References Cited

U.S. PATENT DOCUMENTS

| 2007/0283252 A1* | 12/2007 | Stuhec ................... G06F 16/36 715/234 |
| 2008/0244690 A1* | 10/2008 | Kulkarni ............... G06F 21/552 726/1 |
| 2012/0298747 A1* | 11/2012 | Mestre ................. G06Q 20/354 235/380 |
| 2013/0185167 A1* | 7/2013 | Mestre ................. G06Q 20/20 705/21 |

(Continued)

FOREIGN PATENT DOCUMENTS

| EP | 2506226 A1 | 10/2012 |
| WO | 2012037971 A1 | 3/2012 |
| WO | 2012162351 A1 | 11/2012 |

OTHER PUBLICATIONS

EPO Preliminary Search Report dated Dec. 9, 2016, French Application No. 1658266, pp. 1-2.

*Primary Examiner* — Jessica Lemieux
(74) *Attorney, Agent, or Firm* — MH2 Technology Law Group LLP

(57) ABSTRACT

Method of controlling an electronic device and corresponding electronic device. The method may be performed by an electronic device (20) and includes steps such as receiving an instruction command (CMD) that includes identifiers (ID) of instructions (IS) that are prerecorded in a memory (30) of the electronic device; using the identifiers to form a code (RC) defining a set of instructions, where the set of instructions combines prerecorded instructions (IS) to execute a security check; and storing the code (RC) in a memory (28) of the electronic device in order to configure the electronic device (20) to execute the security check.

14 Claims, 4 Drawing Sheets

(56) References Cited

U.S. PATENT DOCUMENTS

2016/0314469 A1* 10/2016 Lu .......................... G07F 7/125
2017/0329966 A1* 11/2017 Koganti ................ G06F 21/554

* cited by examiner

METHOD OF CONTROLLING AN ELECTRONIC DEVICE AND CORRESPONDING ELECTRONIC DEVICE

CROSS-REFERENCE TO RELATED APPLICATIONS

This application claims priority to French Application No. 1658266 filed 6 Sep. 2016.

BACKGROUND OF THE INVENTION

The present invention lies in the general field of electronic devices, and more particularly it relates to an electronic device, e.g. such as a smart card, that is suitable for co-operating with an external terminal in order to perform a transaction, e.g. in the field of banking.

The invention applies more particularly, but not exclusively, to smart cards (or microcircuit cards), e.g. in compliance with the ISO 7816 standard. The invention relates in particular to making secure a smart card that operates with the Europay Mastercard Visa (EMV) protocol.

In general manner, a smart card is designed to communicate with a device that is external to the card, otherwise known as a terminal or a reader. Cards enable various types of transactions to be carried out, e.g. such as payment transactions, withdrawal transactions, or indeed bearer authentication transactions. By way of example, smart cards for bank applications (credit cards, debit cards, etc.) are suitable for co-operating with payment terminals or automatic teller machines (ATMs) in order to perform various financial operations.

EMV is the standardized protocol that is nowadays used predominantly throughout the world for securing payment transactions carried out by smart cards, in particular.

The EMV protocol was designed to reduce the risks of fraud during a payment transaction, in particular by enabling both the smart card and its bearer to be authenticated. The authentication process relies on a combination of cryptograms (or encrypted keys) and of digital signatures, and it possibly requires the bearer of the card to input a secret code (commonly referred to as a personal identification number (PIN)).

Depending on the type of card used, on the situation, or indeed on the amount under consideration, an EMV card may operate on-line or off-line. In on-line mode, the EMV card may communicate, via the reader, with the corresponding issuing entity (e.g. the bank that issued the card), in particular in order to verify that the current transaction is legitimate. In contrast, if the EMV card is operating in off-line mode, it itself applies prerecorded verification criteria in order to decide whether the transaction should be authorized or refused.

Numerous security mechanisms have recently been developed in order to make the growing use of smart cards, and in particular of EMV type smart cards, as secure as possible.

Nevertheless, the nature of the security problems that need to be faced by EMV cards is continuously changing. New types of failure or of attack that might affect the operation of a bank card are regularly discovered. That is why new security mechanisms are constantly being developed in order to protect bank cards against new threats as well as possible.

Providing EMV cards with appropriate security mechanisms nowadays thus constitutes a genuine challenge. EMV cards, and more generally electronic devices configured to process transactions, are not always protected in satisfactory manner.

OBJECT AND SUMMARY OF THE INVENTION

To this end, the present invention provides a controlling method performed by an electronic device, said method comprising the following steps:
receiving an instruction command including identifiers of instructions prerecorded in a memory of the electronic device;
forming, based on the identifiers, a code defining a set of instructions, said set of instructions combining prerecorded instructions to execute a first security check; and
storing the code in a memory of the electronic device in order to configure the electronic device to execute the first security check.

The invention advantageously makes it possible to personalize the behavior of the electronic device, which device may be a smart card, e.g. of the EMV type. The personalization is performed using blocks of instructions prerecorded in a memory of the electronic device, and can be triggered remotely, should that be necessary.

By means of the invention, it is possible to personalize the security behavior of the electronic device. In particular, it is possible to adapt a security check executed by the electronic device, in particular while it is processing an EMV transaction. The invention makes it possible to adapt the security behavior of an electronic device, such as an EMV smart card for example, to counter new fraud schemes, including fraud schemes that are detected after the smart card has already begun to be used.

The invention makes it possible not only to personalize the values of parameters in a security check executed by the electronic device, but more generally makes it possible to adapt the actual structure of said security check. It is thus possible to adapt the order or the type of the security check operations that are executed by the electronic device, in particular during an EMV transaction. It is possible to prerecord a plurality of instructions corresponding to various security check operations and to activate one or more instructions in the electronic device from among the available prerecorded instructions in order to program the desired security check operations dynamically.

In a particular implementation, the code is formed by concatenating the received identifiers.

In a particular implementation, the instruction command is a script command received during an EMV transaction.

In a particular implementation, the method includes a step of executing the set of instructions defined by the code so as to perform the first security check during a transaction being processed by the electronic device.

In a particular implementation, the step of executing the set of instructions is performed in response to a GENERATE AC command previously received from an external terminal in compliance with the EMV protocol.

In a particular implementation, the step of executing the set of instructions comprises:
determining a first result delivered by performing the first security check; and
performing at least one security operation defined in said set of instructions, the security operation being a function of the first result of the first security check.

In a particular implementation, said at least one security operation comprises at least one of the following:

sending a notification including data representative of the first result of the first security check;

storing history data in a memory of the electronic device, the history data being representative of the first result of the first security check; and generating a security decision specifying how the current transaction is to be processed.

In a particular implementation, the data representative of the first result of the first security check is sent in an issuer discretionary data (IDD) parameter included in the issuer application data (IAD) field of a transaction message in compliance with the EMV protocol.

In a particular implementation, the prerecorded instructions forming said set of instructions comprise:

at least two first prerecorded instructions for executing a plurality of security check operations as the first security check;

at least one second prerecorded instruction comprising a link operator defining a combining logic link between said security check operations; and at least one third prerecorded instruction for executing a said security operation as a function of the result of said security check operations in compliance with said combining logic link.

In particular on the basis of the link operators, it is possible to use syntax that offers great flexibility in the way in which the configuration of the electronic device is personalized.

In a particular implementation, the first result of the first security check is a boolean.

In a particular implementation, the link operator comprises at least one of the following:

an "AND" operator;

an "OR" operator;

an equality or inequality operator; and a comparison operator.

In a particular implementation, the method comprises the following steps:

performing a preliminary security check before the first security check, the preliminary security check delivering a preliminary result;

determining a final result on the basis of the preliminary result from the primary security check and of the result from the first security check; and processing the current transaction in accordance with the final result.

In a particular implementation, the preliminary result corresponds to a first degree of security and the final result corresponds to a second degree of security, said second degree of security being at least as high as the first degree of security. This particular implementation serves to strengthen the security behavior of the electronic device. In particular, it serves advantageously to avoid degrading the security level of the electronic device, specifically in the event of a security check being activated in non-authorized manner from the prerecorded instructions.

In a particular implementation, before the step of receiving the instruction command having the identifiers of prerecorded instructions, the method comprises a step of storing said prerecorded instructions in the memory of the electronic device.

In a particular embodiment, the various steps of the controlling method are determined by computer program instructions.

Consequently, the invention also provides a computer program on a data medium (or recording medium), the program being suitable for being performed in an electronic device or more generally in a computer, the program including instructions adapted to perform steps of a controlling method as described above.

The program may use any programming language, and be in the form of source code, object code, or code intermediate between source code and object code, such as in a partially complied form, or in any other desirable form.

The invention also provides a computer-readable data medium (or recording medium) including instructions of a computer program as mentioned above.

The data medium may be any entity or device capable of storing the program. For example, the medium may include storage means such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

The invention also provides an electronic device comprising:

a memory;

a receiver module configured to receive an instruction command including identifiers of instructions prerecorded in said memory;

a forming module configured, on the basis of the identifiers, to form code defining a set of instructions, said set of instructions combining the prerecorded instructions to execute a first security check; and a storage module configured to store the code in a memory of the electronic device so as to configure the electronic device to execute the first security code.

It should be observed that the various implementations mentioned above with reference to the controlling method of the invention and the associated advantages apply in analogous manner to the electronic device of the invention.

In an embodiment, the invention is implemented by means of software and/or hardware components. In this context, the term "module" as used in this document may correspond equally well to a software component or to a hardware component, or to a combination of hardware and software components.

BRIEF DESCRIPTION OF THE DRAWINGS

Other characteristics and advantages of the present invention appear from the following description given with reference to the accompanying drawings, which show implementations having no limiting character. In the figures.

DETAILED DESCRIPTION OF IMPLEMENTATIONS

As mentioned above, the present invention relates to electronic devices, e.g. such as smart cards, configured to co-operate with an external terminal in order to perform a transaction, e.g. in the banking field.

The invention seeks to improve the checking of such electronic devices in particular in order to protect those devices better against security risks. The invention also seeks to improve the tracking of the use that is made of such an electronic device by its user(s).

Figure 1:
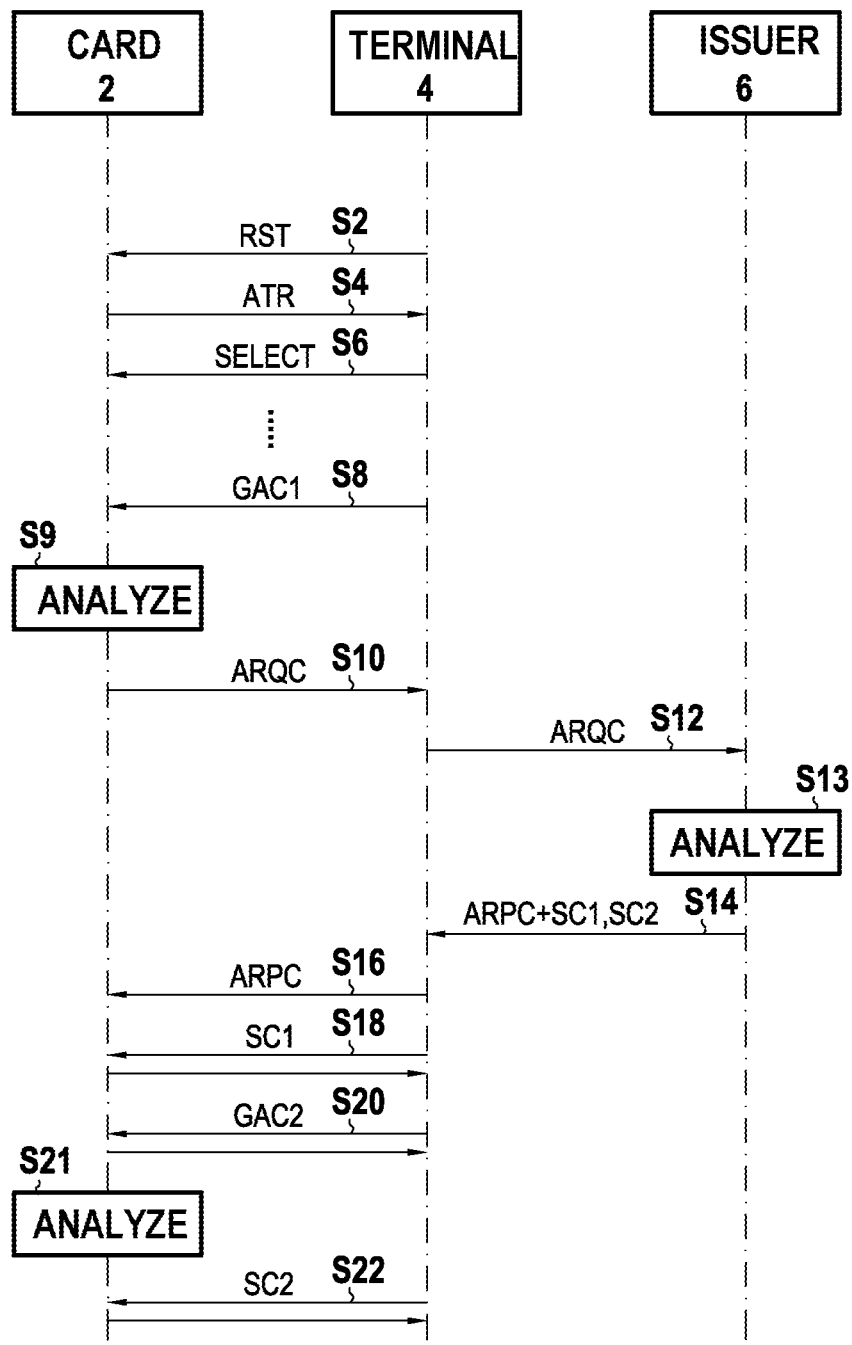
FIG. 1 is a diagram of an EMV transaction in a particular implementation.

FIG. 1 shows an example of a payment transaction in accordance with the EMV protocol, using a smart card 2. In this example, the card 2 is an EMV card.

When performing a transaction, the EMV protocol is organized in three stages, although variants are nevertheless possible. It can be understood that certain elements and operations generally performed during an EMV transaction are voluntarily omitted since they are not necessary for understanding the present invention.

During a first stage, for authenticating the smart card 2 that is being used, the terminal 4 and the card 2 exchange a RESET (RST) message in S2 followed by an ATR response in S4.

In S6, the bearer of the card uses the terminal 4 to select the desired transaction mode, thereby causing a "SELECT" command to be sent to the card 2 in order to initiate the start of the EMV transaction.

Once the stage of authenticating the card has been completed, the EMV protocol proceeds with a stage (not shown) of authenticating the bearer of the card 2. The terminal 4 determines which bearer authentication method to apply and in particular it determines whether the transaction is to be performed in a mode involving code verification or in a mode without code verification. If code verification mode is selected, the smart card 2 verifies the validity of the PIN number input by the bearer via the terminal 4. In contrast, if the mode without code verification is selected, no PIN number verification is performed. By way of example, this situation occurs when the terminal is not capable of taking charge of verifying a PIN number. Under such circumstances, the bearer's handwritten signature may possibly be required to authenticate the bearer.

Once the bearer authentication stage has been completed, the EMV protocol initiates the stage of verifying the transaction. To do this, the terminal 4 sends (S8) a first application protocol data unit (APDU) command to the smart card 2, which command is known as GENERATE AC or GAC, and is written herein GAC1. This command, which is well known to the person skilled in the art, includes information about the current transaction such as the amount of the transaction, the currency used, the type of the transaction, etc.

On the basis of the data received in the command GAC1, the EMV card then performs a first security check during which the card 2 verifies (S9) the transaction in application of predefined verification criteria. Thereafter, in response, the card 2 sends (S10) a cryptogram (or cryptographic certificate) including a message authentication code (MAC). The MAC authentication code may for example be encrypted using a cryptographic key stored in the card 2. The response of the card 2 in the message ARQC depends in particular on the way the card was set by the entity that issued said card (referred to as the "issuer").

More precisely, in the example shown in FIG. 1, the smart card 2 sends an authorization request cryptogram (ARQC) type message in S10 indicating that the card seeks to continue with the transaction on line, e.g. with a remote server of the issuer 6 of the card 2 that is being used (on-line mode). The terminal 4 then transmits (S12) the cryptogram ARQC to the issuer 6, which remotely performs (S13) a certain number of verifications in order to ensure that the transaction is valid. Thereafter, in response, the terminal 4 receives (S14) an encrypted message of the authorization response cryptogram (ARPC) type giving the decision of the issuer 6. In S14, the terminal T1 may also receive one or more commands from the issuer 6, referred to as "script" commands, each requiring at least one operating parameter to be modified in the smart card 2. In this example, two script commands SC1 and SC2 are sent in S14 by the issuer 6.

The terminal 4 then transmits (S18, S22) the message ARPC (S16) and each of the script commands SC1 and SC2 to the card 2.

More particularly, in the example shown in FIG. 1, the terminal 4 sends (S18) the script command SC1 to the card 2. In response to this command SC1, the smart card 2 modifies the value of at least one operating parameter in appropriate manner. Thereafter, the terminal 4 sends (S20) a second well-known APDU command of the GENERATE AC or GAC type, written herein GAC2, to the smart card 2. During a security check step S21, the card 2 determines how to continue the current transaction. If the card 2 accepts the transaction, it responds to the command GAC2 by sending a cryptogram of the transaction accepted (TC) type to the terminal T1. Otherwise, the card 2 sends a cryptogram of the AAC type to the terminal 4 indicating that the transaction is refused. In addition, still in this example, the terminal 4 then sends (S22) the script command SC2 to the card 2. In response to this command SC2, the card 2 modifies the value of at least one operating parameter in appropriate manner.

Each script command SC1, SC2 coming from the issuer 6 may be received during a transaction either before or after receiving the command GAC2, and may give rise to an exchange of data between the card 2 and the terminal 4. The number and the nature of the script commands received and also the way in which they are processed by the card 2 can vary depending on circumstances.

The script commands SC1 and SC2 thus serve to modify the values of operating parameters such as limit threshold values, e.g. the limit amount above which an on-line transaction is required. In contrast, the script commands as described above do not make it possible to adapt the type of parameter verifications that are performed by the card 2 during the checks S9 and S21. In particular, it is not possible at present to modify the very nature (or the structure) of the checking operations carried out by the card 2, nor even the order in which such parameter verifications are performed.

In known manner, the structure and the order of the checking verifications carried out by the card 2 are "frozen" by the computer program code that is stored in permanent manner in the card. As a security measure, this code is stored in secure manner so as to make it difficult for an ill-intentioned third party to alter it. Furthermore, the instructions to be executed by the card 2 during these checking verifications are certified by a competent authority. Any subsequent alteration of these instructions, e.g. by the manufacturer, leads to the loss of such certification. Thus, at present, it is not possible during the lifetime of an EMV card to personalize the structure of the checking verifications carried out by said card during a current transaction.

The invention proposes a method of control that makes it possible to personalize the instructions executed by the smart card, and more generally by an electronic device, in order to perform a security check, and to do so without losing the certification of the program that is included in the card. In various implementations, the method of the invention performed by an electronic device such as a smart card, for example, comprises: receiving an instruction command including identifiers corresponding to instructions that are prerecorded in a memory of the electronic device; on the basis of the identifiers, forming a code defining a set of instructions, said set of instructions combining the prerecorded instructions for executing a first security check; and storing the code in a memory of the electronic device so as to configure the electronic device to execute the first security check.

The invention also provides an electronic device configured to implement a control method as defined above.

In the present disclosure, implementations of the invention are described with reference to a smart card of the EMV type. It can be understood that the invention is not limited exclusively to EMV smart cards, but applies more generally to any electronic device configured to perform a transaction, including devices other than smart cards and making use of the EMV standard, and electronic devices that use other transaction standards.

It may also be observed that the concept of a transaction is broadly extended herein and, by way of example, in the banking field, covers not only a payment or transfer transaction, but also consulting a bank account on a bank terminal. The various implementations of the invention that are described herein are described in the context of a payment card for performing bank transactions. It should be understood that other types of transaction or operation can be envisaged in the ambit of the invention.

Unless specified to the contrary, elements that are common or analogous in more than one of the figures are given the same reference signs and present characteristics that are identical or analogous, such that these common elements are generally not described again for reasons of simplicity.

Figure 2:
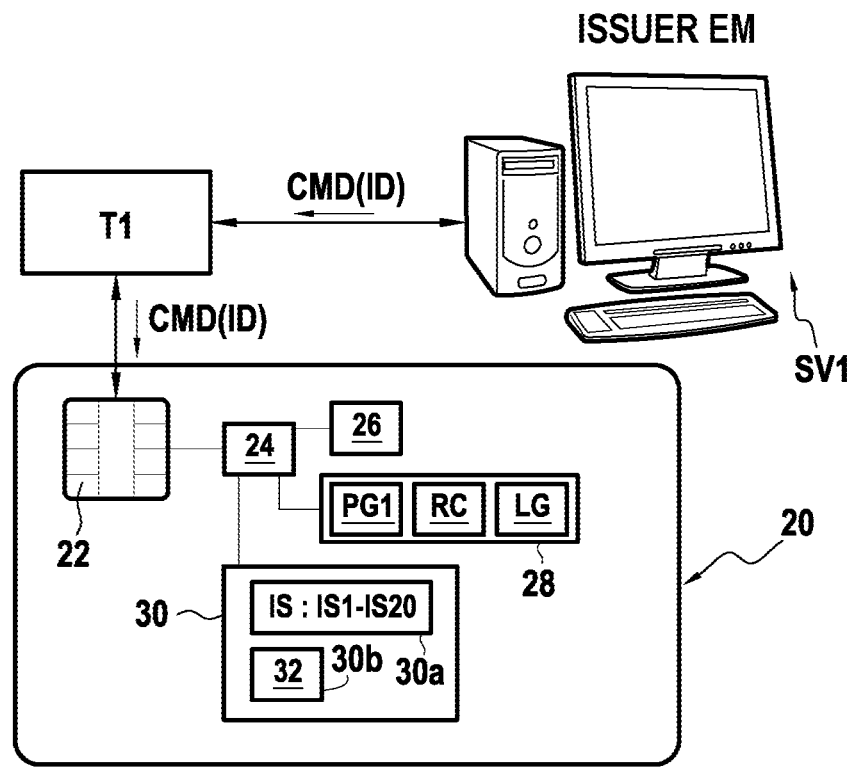
FIG. 2 is a diagram showing the structure of a smart card configured to co-operate with an external terminal, in accordance with a particular embodiment of the invention.

FIG. 2 is a diagram showing the structure of an EMV type smart card 20 in accordance with a particular embodiment.

It can be understood that certain elements that are generally present in an EMV smart card are voluntarily omitted since they are not necessary for understanding the present invention. It should also be observed that the smart card 20 shown in FIG. 2 constitutes merely one embodiment, and others are possible in the ambit of the invention. In particular, the person skilled in the art should understand that certain elements of the smart card 20 are not described herein solely to make the invention easier to understand, since those elements are not necessary for implementing the invention.

The smart card 20 is configured to co-operate with a terminal (or reader) T1 in order to perform a transaction, such as a financial or banking transaction (specifically a payment transaction in the present example).

The terminal T1 is configured in particular to act as an interface between the smart card 20 and a remote server SV1. In the present example, the server SV1 is a server of the entity EM that issued the smart card 20 (e.g. a banking institution). In this example, the smart card 20 is configured to use the terminal T1 to communicate with the remote server SV1 in order to use the EMV protocol to perform a so-called "on-line" transaction, i.e. a transaction involving an exchange with the issuer EM.

More precisely, the smart card 20 in this example has external contacts 22 configured to co-operate with the reader T1, a processor 24, a rewritable volatile memory or "random access" memory (RAM) 26, a rewritable non-volatile memory 28 (e.g. of the flash type), and a ROM 30.

In this example, the memory 28 constitutes a data medium (or recording medium) in accordance with a particular embodiment that is readable by the smart card 20 and that records a computer program PG1 in accordance with a particular embodiment. The computer program PG1 includes instructions for executing steps of a controlling method in a particular implementation. The principle steps of this method are shown for particular implementations of the invention in FIGS. 4 and 5, as described below.

In a particular example, the smart card 20 complies with the ISO 7816 standard. Under such circumstances, the external contacts 22 have characteristics that comply with that standard. Nevertheless, it can be understood that other embodiments are possible without using such external contacts. For example, the smart card 20 may be configured to co-operate with the reader T1 in a contactless mode via a radiofrequency (RF) antenna integrated in the card 20.

Still in the presently-described example, the rewritable non-volatile memory 28 is configured where appropriate to store a code (or indicator) written herein RC, together with a history file or "log" LG. The code RC and the log LG are described in greater detail below with reference to FIGS. 3 to 6.

In this example, the ROM 30 includes instructions 32 that can be executed by the processor 24, these instructions 32 being "frozen" (or static), i.e. their structure (type of operation, order of operations, etc.) cannot be modified. In particular, these instructions 32 may define at least one security check operation (or security verification) to be executed by the smart card 20 during a transaction that is being processed.

The term "security check" is used to cover a check (or verification) performed by the smart card 20 on the basis of at least one parameter in order to deliver a result. The check may in particular relate to at least one parameter held in memory in the smart card 20 and/or to at least one parameter received by the smart card 20, e.g. during a current transaction. By way of example, the check may serve to evaluate a degree of security of the smart card 20 and, where necessary, to trigger as a result any appropriate security reaction.

By way of example, the static instructions 32 define verifying the amount of a current transaction such that, if the amount reaches a certain limit threshold value, on-line mode is required by the EMV card 20. Since these instructions 32 are static, the threshold value may be modified, where appropriate, but the actual structure of the checking operation cannot be modified, this checking operation being executed systematically by the smart card 20.

The ROM 20 also includes prerecorded instructions written IS (also referred to as dynamic instructions), in the form of software bricks (or software blocks), these instructions IS being interpretable by the card 20 and being suitable for being activated, where appropriate, in response to a command CMD so as to be executed by the processor 24. In the deactivated state, a prerecorded instruction IS is not executed by the smart card 20. At least one of these prerecorded instructions IS defines a security check (or security verification) to be executed by the smart card 20, e.g. during a transaction that is being processed. In contrast to the static instructions 32, execution or non-execution of the prerecorded instructions IS can be personalized. The prerecorded instructions constitute software bricks from which it is possible to build sets of instructions that are more complex and of structure and sequencing that can be personalized.

In a particular example, a prerecorded instruction IS (that is in the activated state) may also be deactivated, should that be necessary, in response to a deactivation command.

In the presently-described example, the instructions IS are prerecorded in a first dedicated memory zone 30a and the static instructions 32 are prerecorded in a second dedicated memory zone 30b that is independent of the first dedicated memory zone 30a. This particular configuration makes it possible to avoid any conflict between the static instructions 32 and the prerecorded instructions IS. By means of this particular configuration, it is possible to reduce the risks of an ill-intentioned third party manipulating the data associated with the static instructions of the smart card.

By way of example, the instructions IS may be prerecorded during fabrication of the smart card 20, at the time the operating system is initially loaded into the chip of the smart card 20.

In the presently-considered example, it is assumed that the smart card 20 has 20 prerecorded instructions IS (or instruction blocks) referenced respectively IS1 to IS20. These instructions are encoded in any language that can be interpreted by the processor 24 of the smart card 20. As described below, at least one of these instruction blocks can be activated, where necessary, in order to personalize the behavior of the smart card 20, and in particular the way in which the smart card 20 processes a transaction.

Figure 3:
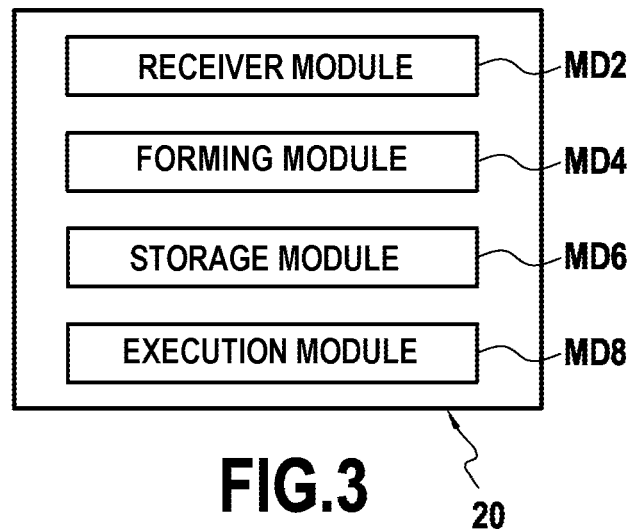
FIG. 3 is diagram showing modules used in the FIG. 1 smart card, in a particular embodiment.

The processor 6 under the control of the computer program PG1 in this example deploys some number of modules as shown in FIG. 3, namely: a receiver module MD2, a forming module MD4, a storage module MD6, and an execution module MD8.

As shown in FIGS. 2 and 3, the receiver module MD2 in this example is configured to receive an instruction command CMD including identifiers ID corresponding to instructions IS prerecorded in the memory 30 of the smart card 20. As explained below, such a command CMD may be a script command as described in the above example with reference to steps S18 and S22 of FIG. 1. In a particular example, the script command CMD received by the receiver module MD2 presents a Basic Encoding Rule-Tag Length Value (BER-TLV) structure in compliance with the ISO 7816-4 standard. As explained below, the command CMD may for example be a "constructed" object comprising a plurality of concatenated BER-TLV objects.

The forming module MD4 is configured to use the identifiers ID received by the receiver module MD2 to form a code RC (mentioned above) defining a set of instructions (written "40" below), this code being interpretable by the smart card 20 and more particularly by the processor 22. This set of instructions combines the prerecorded instructions IS, corresponding to the received identifiers ID, in order to execute a first security check, also referred to as an "extended security check" (written "CHK2" below).

The code RC may be in any appropriate form. In a particular example, the code RC presents a format in compliance with BER-TLV.

The storage module MD6 is configured to store the code RC in a memory of the smart card 20 (in the memory 28 in this example), thereby configuring the smart card 20 to execute the first security check.

The execution module MD8 is configured to execute the set of instructions defined by the code RC so as to perform the first security check during a transaction being processed by the smart card 20.

The configuration and the operation of the modules MD2-MD8 of the smart card 20 appear in greater detail from the implementations described below with reference to FIGS. 4 to 6. Nevertheless, it should be understood that the modules MD2-MD8 as shown in FIG. 3 constitute merely a non-limiting implementation of the invention.

In a particular implementation of a controlling method, the smart card 20, as shown in FIGS. 2 and 3, performs the following steps as described below with reference to FIGS. 4 and 5. For this purpose, the smart card 20 executes the computer program PG1.

In this example, it is assumed that the smart card 20 is in an initial state in which none of the prerecorded instructions IS1-IS20 are activated. These instructions IS1-IS20 are thus available in the memory 30, but they are not executed by the smart card 20. In contrast, and as mentioned above, by their very nature, the static instructions 32 are always executed by the smart card 20.

In a particular implementation, the method has a preliminary step (not shown) of storing the instructions IS1-IS20 in the memory 30. As mentioned above, in the presently-considered example, the instructions IS are prerecorded in a first dedicated memory zone 30a, while the static instructions 32 are prerecorded in a second dedicated memory zone 30b that is independent of the first dedicated memory zone 30a, this configuration serving to make the prerecorded (dynamic) instructions IS more secure and also serving to avoid any conflict between the static instructions 32 and the prerecorded instructions IS.

Figure 4:
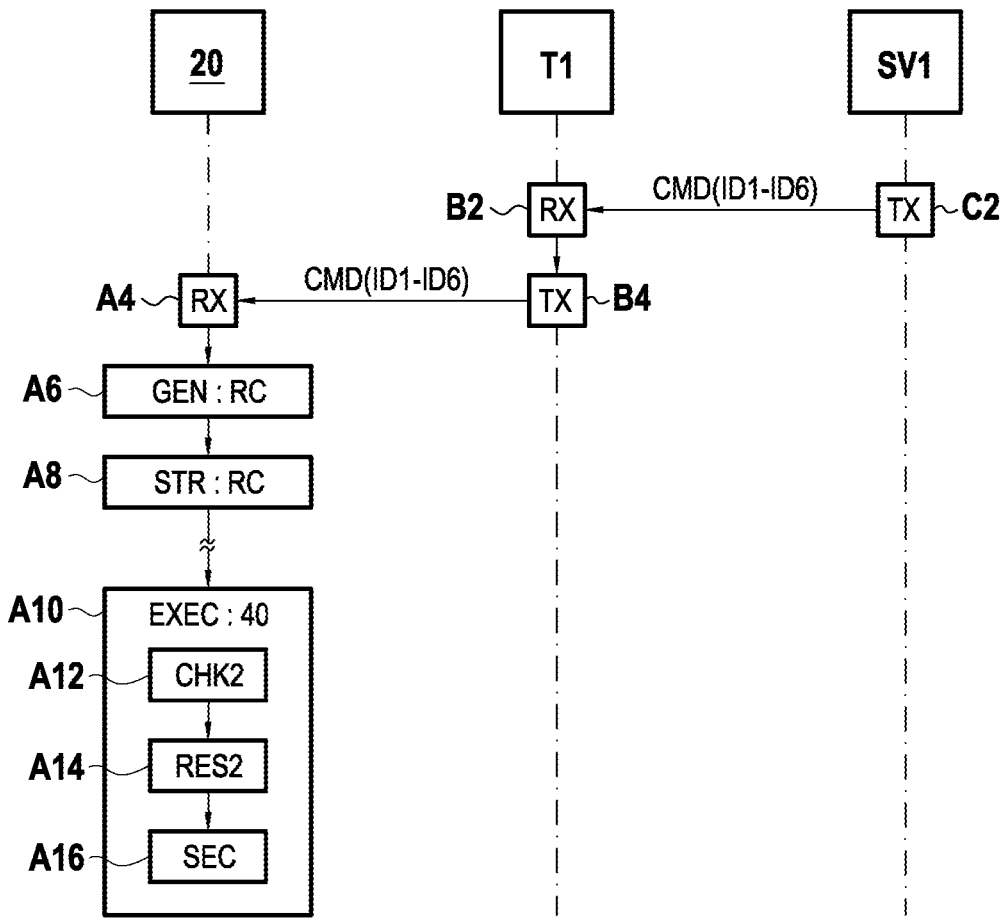
FIG. 4 is in the form of a flow chart and it shows the steps of a control method in a particular implementation.

As shown in FIG. 4, it is assumed at this point that the server SV1 of the issuer EM sends (C2) an instruction command CMD to the smart card 20, said command CMD including the identifiers ID1 to ID6 corresponding respectively to the instructions IS1 to IS6 prerecorded in the memory 30. By way of example, this command CMD is sent (C2) when the issuer EM detects a new fraud scheme and seeks to adapt the security behavior of the smart card 20 accordingly.

In B2, the terminal T1 receives the command CMD and transmits it to the card 20 in B4. The smart card 20 receives the instruction command CMD in A4.

In a particular example, the command CMD is a BER-TLV object (known as a "constructed" object) in compliance with the ISO 7816-4 standard, with this command CMD comprising the concatenation of the identifiers ID1 to ID6.

By way of example, the command CMD is a script command transmitted to the smart card 20 during an EMV transaction, e.g. as described above with reference to steps S18 to S22 shown in FIG. 1. When the script command is received before receiving the GAC2 (as in S18, FIG. 1), it is possible to influence the way the current transaction and subsequent transactions are subjected to security processing. When the script command is received after receiving GAC2 (as in S22, FIG. 1), it is possible to influence the way subsequent transactions are subjected to security processing.

Figure 5:
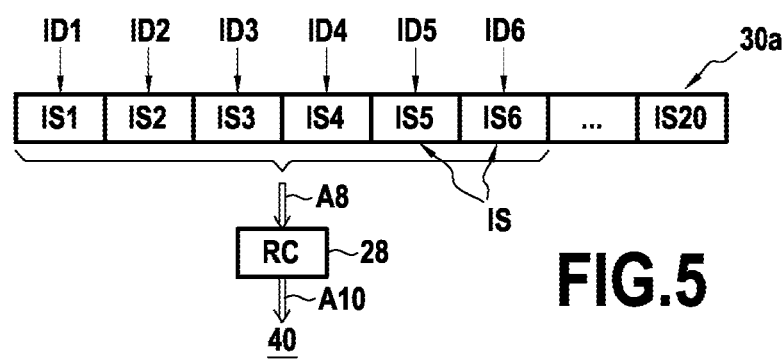
FIG. 5 is a diagram showing the control method shown in FIG. 4.

In response to the command CMD, and on the basis of the identifiers ID1-ID6 received in the command CMD, the smart card 20 generates or forms (A6) a code (or indicator) RC defining a set of instructions referenced 40 (FIGS. 4 and 5). This set of instructions 40 combines the prerecorded instructions IS1-IS6 (corresponding respectively to ID1-ID6) for executing a first security check referred to as an "extended" security check, and referenced CHK2.

In a particular example, the command CMD received in A4 comprises the code RC, which code includes the identifiers ID1 to ID6.

The code RC may be in any appropriate form and in a language that can be interpreted by the processor 24. In a particular example, the smart card 20 forms (A6) the code RC by concatenating the identifiers ID1 to ID6. By way of example, the code RC generated in A6 presents a BER-TLV structure. A more precise example of forming such a code RC is described below.

As mentioned below, the nature of the set of instructions 40 defined by the code RC may vary depending on the implementation under consideration. In particular, the way in which the smart card 20 combines the prerecorded instructions IS1-IS6 to form the set of instructions 40 may be a function of the command CMD that is received.

Figure 6:
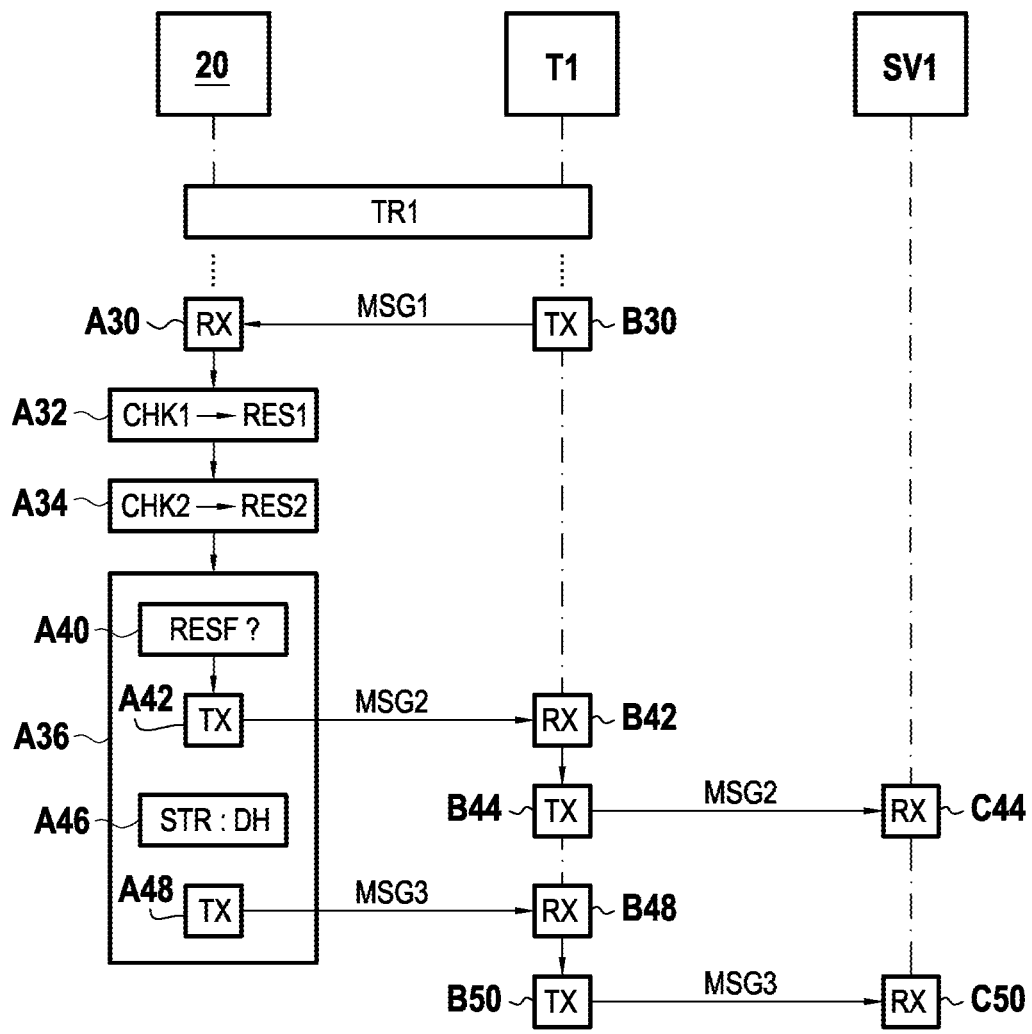
FIG. 6 is in the form of a flow chart showing the steps of a control method in accordance with a particular implementation.

During a storage step A8, the smart card 20 stores the code RC in its memory 28 (FIGS. 4 and 6). Storing A8 configures the smart card 20 to execute the first security check CHK2 in application of the set of instructions 40. In other words, the act of storing A8 leads to activation of the set of instructions 40 as generated from the prerecorded instructions IS1-IS6. Once storage A8 has been completed, the set of instructions 40 forms an integral portion of the program that can be executed by the processor 24.

By way of example, the code RC is stored in a file stored in the memory 28. The storing of this file is preferably made secure so that it cannot easily be altered or deleted by an ill-intentioned third party. The code RC may also be encrypted so that the smart card 20 can subsequently authenticate it, thus preventing falsified codes RC being stored in the memory 28 of the smart card 20 by an ill-intentioned third party.

In an implementation, the smart card 20 generates (A6) a plurality of codes RC, each defining a corresponding set of instructions 40.

In the presently-considered example, it is assumed at this point that the processor 24 executes (A10) the set of instructions 40 generated in A6. To do this, the processor 24 interprets the code RC stored in the memory 28 and deduces therefrom the combination of prerecorded instructions IS1-IS6 that is to be executed (FIGS. 4 and 5). The set of instructions 40 may be executed during an EMV transaction that is being processed by the smart card 20, e.g. in response to a command of the GAC1 or GAC2 type, as described above with reference to FIG. 1.

In a particular example, the smart card 20 executes the set of instructions 40 during a first checking step as described above with reference to the step S9 (in response to the message GAC1) shown in FIG. 1.

In a particular example, the smart card 20 executes the set of instructions 40 during a first checking step as described above with reference to the step S21 (in response to the message GAC2) shown in FIG. 1.

In the example shown in FIG. 4, while executing A10 the set of instructions 40, the processor 24 interprets the code RC and accesses the prerecorded instructions IS1-IS6 in the ROM 30 in order to perform (A12) the security check CHK2 (or security verification) on a current EMV transaction. The nature and the structure of the security check CHK2 may vary depending on circumstances, and in particular on the needs of the issuer EM of the smart card 20. In a particular example, the security check CHK2 comprises verifying the type of terminal with which the smart card 20 is co-operating during the current transaction.

In this example, the smart card 20 determines (A14) a result RES2 as delivered by the security check CHK2. By way of example, the result RES2 may be a boolean (TRUE or FALSE). Thereafter, the smart card 20 performs (A16) at least one security operation SEC defined in the set of instructions 40, the security operation SEC being a function of the result RES2 of the security check CHK2 performed in A12.

Various security operations (or security reactions) SEC may be performed in A16 by the smart card 20, as described in particular below with reference to FIG. 6. In a particular example, the smart card 20 may perform (A16) at least one of the following security operations SEC:

process the current transaction in response to a security decision as generated by the smart card 20 as a function of the result RES2 obtained in A14;

send a notification to an external device (e.g. the server SV1), the notification including data representative of the result RES2 of the security check CHK2 performed in A12, for example; and storing, in a memory of the smart card 20 (e.g. in the log file LG), history data representative of the security check CHK2 performed in A12.

The invention makes it possible advantageously to personalize the behavior of a smart card, e.g. the EMV type, on the basis of instruction blocks that are prerecorded in a memory of said card. This personalization may be triggered remotely by the issuer of the smart card or by any other appropriate entity. It is thus possible to personalize the configuration of an EMV card at any moment during the lifetime of said card, and to do so without running the risk of potentially losing the certification of the smart card, insofar as all of the prerecorded instruction blocks may be covered by the certification.

By means of the invention, it is possible to personalize the security behavior of an EMV card. In particular, it is possible to adapt a security check executed by the card, specifically to a current EMV transaction.

The invention makes it possible to adapt the security behavior of an EMV card to new fraud schemes, including fraud schemes that are detected only after the smart card has already begun to be used.

The invention makes it possible not only to personalize the values of parameters for a security check executed by the EMV card, but more generally to personalize the actual structure of said security check. It is thus possible to adapt the order or the type of security check operations that are executed by an EMV card, in particular during an EMV transaction. It is possible to prerecord a plurality of instructions corresponding to various security check operations and to activate one or more instructions in the EMV card from among the available prerecorded instructions in order to program the desired security check operations dynamically.

The invention also makes it possible, where necessary, to update the configuration of the smart card by adapting the set of instructions 40 stored in its memory. To do this, new commands CMD may be sent subsequently to the smart card 20, in particular in order to adapt the instruction blocks IS that are in the activated state or the deactivated state.

It should be observed that the invention makes it possible not only to make an EMV smart card secure, but also to monitor and study the use that is made of the card in improved manner, in particular in order to have better knowledge of the consumer habits of a user or indeed to check that the smart card 20 is being used by the legitimate bearer.

In a particular example, a prerecorded instruction IS defines a parameter operation, or where appropriate a plurality of parameter operations.

In a particular example, a plurality of prerecorded instructions IS together form a checking operation.

In order to enable a complex set of instructions 40 to be defined that has a plurality of checking operations, some of the prerecorded instructions IS (at least one of them) may correspond to respective link operators for defining a logical link between two (or more) checking operations. Among the possible link operators, the following boolean operators may be considered, for example:
- the "AND" operator for the intersection of the element concerned;
- the "OR" operator for the union of the elements concerned; and
- the "AND NOT" operator for the exclusion of the element(s) concerned.

The above examples of link operators thus make it possible to combine checking operations in various ways.

Other link operators are possible, including:
- an equality operator ("=") for equality between the elements concerned;
- an inequality operator ("≠") for inequality between the elements concerned; and
- a comparison operator (">", "≥", "<", or "≤") defining a comparison between the elements concerned.

These link operators form the basis of syntax that can be used by the issuer EM of the smart card 20 to define the set of instructions 40 that is to be executed from prerecorded instructions IS. The command CMD may thus comprise at least one identifier ID corresponding to a prerecorded instruction IS that defines one such link operator. On the basis of these link operators, it is possible to use syntax giving great flexibility in the way in which the configuration of the smart card 20 is personalized.

In a particular example, the prerecorded instructions IS forming the set of instructions 40 (FIGS. 4 and 5) comprise:
- at least two first prerecorded instructions IS for executing security check operations (to constitute the security check CHK2);
- at least one second prerecorded instruction IS comprising a link operator defining a combining logic link between said security check operations, as described above; and
- at least one third prerecorded instruction for executing a said security operation as a function of the result of said security check operations in compliance with said combining logic link.

In a particular example, it is assumed for example that the instructions IS1 to IS6 that are activated by the command CMD, as described above with reference to FIGS. 4 and 5, are defined as follows:
- IS1 (corresponding to ID1): defines a checking operation comprising comparison between the elements concerned;
- IS2 (corresponding to ID2): defines the link operator;
- IS3 (corresponding to ID3): defines the application transaction counter (ATC) parameter in compliance with EMV, this ATC parameter being managed by the smart card 20 in such a manner as to be incremented on each new transaction, in a manner well known to the person skilled in the art;
- IS4 (corresponding to ID4): defines a predefined threshold value V1, e.g. expressed in hexadecimal;
- IS5 (corresponding to ID5): indicates that a security reaction SEC of the smart card 20 is performed if the result RES2 of the comparison operation defined by IS1-IS4 is positive; and
- IS6 (corresponding to ID6): defines the type of security reaction (or security operation) SEC performed by the smart card 20.

In this particular example, the code RC formed in A6 (FIGS. 4 and 5) by the smart card 20 presents by way of example the following BER-TLV structure (or format):

RC={ID1 L1 ID2 ID3 ID4 ID5 L2 ID6} where L1 defines the length as a number of bits of the portion (or value) "ID2 ID3 ID4", this portion of the code RC corresponding to the variables of the comparison operation specified by ID2; and where L2 defines the length as a number of bits of the portion (or value) "ID6", this portion of the code RC corresponding to the variable for the security reaction specified by ID6.

In a particular example, the code RC presents a BER-TLV format as follows:

RC={T L {T1 L1 V1} ... {Tn Ln Vn}} so as to code the "AND" instruction applying to each sub-object {T1 L1 V1} to {Tn Ln Vn} (where $\underline{n}$ is an integer greater than or equal to 2), each of the sub-objects including as its respective value V1 to Vn at least one identifier ID of a prerecorded instruction IS.

In the presently-considered example, the smart card 20 is configured in A10 (FIGS. 4 and 5) to interpret the code RC and to deduce therefrom that it is to perform a checking operation consisting in verifying whether the value of the ATC parameter, as updated by the smart card 20, is greater than or equal to the predefined threshold value V1, and if so, to perform (in A16) the security reaction defined in the prerecorded instruction IS6. As explained (and as shown in greater detail below), various security operations SEC can be envisaged in the ambit of the invention. In the presently-considered example, executing the prerecorded instruction IS6 may cause the smart card 20 to force continuation of the current transaction on line, for example.

There follows a description with reference to FIG. 6 of the steps performed by the smart card 20 shown in FIGS. 2 and 3 during a controlling method in a particular implementation. To do this, the smart card 20 executes the computer program PG1.

In this example, it is assumed that the smart card 20 is in an initial state in which the prerecorded instructions IS1-IS6 have been activated as described above with reference to FIGS. 4 and 5.

As shown in FIG. 6, it is assumed at this point that an EMV transaction written TR1 (e.g. a payment transaction) is being processed by the smart card 20 in co-operation with the terminal T1. During a sending step B30, the terminal T1 sends a message MSG1 to the smart card 20. In response to the message MSG1, the smart card 20 performs (A32) a preliminary security check CHK1 (known as a "card risk management" check) by executing the static instructions 32, which by their very nature, and as mentioned above, are always executed by the smart card 20. The preliminary security check CHK1 delivers (A32) a first result RES1.

Thereafter, the smart card 20 performs (A34) the "extended" security check CHK2 in the same manner as described with reference to step A12 shown in FIG. 4. As explained above, the smart card 20 executes the set of instructions 40 defined by the code RC stored in the memory 28. The security check CHK2 delivers (A34) a second result RES2.

In a particular example, the message MSG1 is a message GAC1 as described above with reference to step S8 shown in FIG. 1. Under such circumstances, the security checks CHK1 and CHK2 may be performed, by way of example, in succession during the checking step S9 shown in FIG. 1.

In a variant, the message MSG1 is a message GAC2 as described above with reference to the step S20 shown in FIG. 1. Under such circumstances, the security checks CHK1 and CHK2 are performed, by way of example, in succession during the checking step S21 shown in FIG. 1.

During a security (or processing) step A36, the smart card 20, in compliance with the set of instructions 40 defined by the code RC, performs at least one security operation as described above with reference to the step A16 shown in FIG. 4. In this example, the security operation(s) is/are a function of the results RES1 and RES2 of the respective security checks CHK1 and CHK2.

More specifically, in the particular example shown in FIG. 6, the smart card 20 determines (A40) a final result RESF on the basis of the preliminary result RES1 from the preliminary security check CHK1 and the result RES2 from the extended security check CHK2. Thereafter the smart card 20 processes the current transaction TR1 in compliance with the final result RESF. In a particular example, the smart card 20 sends (A42) a message MSG2 to the terminal T1 specifying the security decision taken by said card 20 concerning the current transaction TR1 (accept, reject, request continuation of the transaction on line, . . . ). The terminal T1 receives (B42) the message MSG2 and transmits (B44) it to the server SV1, which receives it in C44.

The security reaction performed by the smart card 20 in A40 as a function of the result RESF may vary depending on circumstances. In a particular example, the smart card 20 performs at least one of the following security reactions, listed in order of increasing security:
force the current transaction to continue on-line;
force a change of the communication interface via which the smart card 20 is processing the current transaction (e.g. forcing a transaction that is currently being processed in contactless mode to continue in the mode with contact);
force refusal of the current transaction;
block the communication interface via which the smart card 20 is processing the current transaction (e.g. the contactless communication interface of the card);
block the application used by the smart card 20 for processing the current transaction; and
block the smart card 20.

In a particular example, the preliminary result RES1 corresponds to (or is associated with) a first degree of security and the final result RESF corresponds to (or is associated with) a second degree of security, said second degree of security being at least as high as the first degree of security. In other words, the extended security check CHK2 is configured by the set of instructions 40 so that the overall security reaction of the smart card 20 is at least as strong as it would have been if the extended security check CHK2 had not been performed. In this particular implementation, performing the extended security check CHK2 serves to reinforce the security behavior of the smart card 20. This serves advantageously to avoid degrading the security level of the smart card 20, specifically in the event of an extended security check CHK2 being activated in non-authorized manner in the smart card 20.

Still during the security step A36 shown in FIG. 6, the smart card 20 stores (A46), specifically in its log file LG, history data representative of the result RES2 of the extended security check CHK2 (or possibly history data representative of the result RESF obtained in A40). This history data is stored so as to be able to be consulted subsequently, e.g. by the issuer EM.

Still during the security step A36 shown in FIG. 6, in this example the smart card 20 sends (A48) a notification MSG3 including data representative of the result RES2 of the extended security check CHK2 (or possibly data representative of the result RESF obtained in A40). In B48, the terminal T1 receives the notification MSG3 and transmits (B50) it to the server SV1, which receives it in C50.

It should be observed that the nature, the number, and the order (more generally the structure) of the security operations performed by the smart card 20 during the security step A36 may be adapted depending on circumstances, e.g. as a function of choices made by the issuer EM. In a particular example, the smart card 20 performs at least one of the steps A40-A42, A44, and A48 as a security operation during the step A36.

In a particular implementation, if the smart card 20 performs an extended security check CHK2 as described above, it notifies this to the server SV1 of the issuer EM (FIGS. 4 and 6), e.g. in its transaction message MSG2 sent in A42. By way of example, the smart card 20 adapts the state of a bit in the card verification results (CVR) parameter sent to the server SV1 in compliance with the EMV protocol, the state of this bit indicating that an extended security check has been performed by the smart card 20. In particular circumstances, the sending of such a notification can enable the issuer EM to detect that results of the extended security check are available, e.g. in an issuer discretionary data (IDD) parameter sent by the smart card 20 in accordance with the EMV protocol. In a particular example, the message MSG2 sent in A42 includes the CVR parameter and the IDD parameter.

It should be recalled that the issuer application data (IAD) field in the EMV protocol is a required field used by an EMV smart card to inform the issuer that an application is running, this IAD field including a standardized CVR parameter specifying the results of the checking verifications performed by the EMV card. As mentioned above, the smart card 20 may be configured to adapt the value of the CVR parameter so as to notify the issuer EM that an extended security check CHK2 has been performed.

Furthermore, all of the elements of presence in the IAD field that can be configured by the issuer are referred to as "IDD". The potential use of an IDD parameter in the IAD field to transmit the result RES2 of the extended security check of the invention is advantageous in that a greater quantity of information can be transmitted than in the CVR parameter.

A person skilled in the art will understand that the implementations and variants described above merely constitute non-limiting examples of the invention. In particular, the person skilled in the art can envisage any adaptation or combination of the above-described implementations and variants for the purpose of satisfying any particular need.

The invention claimed is:

1. A controlling method performed by an electronic device, said method comprising:
storing, in a first ROM-type memory of the electronic device, a plurality of security check instructions configured to cause performance of one or more security checks of the electronic device, the plurality of security check instructions being in a deactivated state and enabling personalization of the electronic device;
receiving an instruction command including identifiers identifying two or more security check instructions of the plurality of security check instructions;

concatenating the received identifiers to create a code defining a set of instructions, wherein said set of instructions comprises the two or more security check instructions; and storing the code in a second memory of the electronic device accessed by a program executed by the electronic device, wherein the program performs a check of a transaction by executing the set of instructions defined by the code.

2. The method according to claim 1, wherein the instruction command is a script command received during a Europay Mastercard Visa (EMV) transaction.

3. The method according to claim 1, wherein executing the set of instructions is performed in response to a GENERATE AC command previously received from an external terminal in compliance with the EMV protocol.

4. The method according to claim 1, wherein executing the set of instructions comprises:
   determining a first result delivered by performing the check; and
   executing at least one security check instruction defined in said set of instructions, the at least one security check instruction being a function of the first result of the check.

5. The method according to claim 4, wherein said at least one security instruction comprises at least one of the following:
   sending a notification including data representative of the first result of the check;
   storing history data in the memory of the electronic device, the history data being representative of the first result of the check; or
   generating a security decision specifying how the transaction is to be processed.

6. The method according to claim 4, wherein the set of instructions comprise:
   at least two first prerecorded security check instructions for executing a plurality of security check operations as the check;
   at least one second prerecorded security check instruction comprising a link operator defining a combining logic link between said plurality of security check instructions; and
   at least one third prerecorded security check instruction for executing a security operation as a function of the result of said plurality of security check instructions in compliance with said combining logic link.

7. The method according to claim 6, wherein the first result of the check is a boolean.

8. The method according to claim 6, wherein the link operator comprises at least one of the following:
   an "AND" operator;
   an "OR" operator;
   an equality operator;
   an inequality operator; or
   a comparison operator.

9. The method according to claim 4, comprising:
   performing a preliminary security check before the check, the preliminary security check delivering a preliminary result;
   determining a final result on the basis of the preliminary result from the preliminary security check and of the first result from the check; and
   processing the transaction in accordance with the final result.

10. The method according to claim 9, wherein the preliminary result corresponds to a first degree of security and the final result corresponds to a second degree of security, said second degree of security being at least as high as the first degree of security.

11. The controlling method of claim 1, wherein the code is of a BER-TLV structure according to EMV standard.

12. The controlling method of claim 1, wherein the executing the set of instructions comprises interpreting the code stored in the second memory and accessing the prerecorded security check instructions in the first ROM-type memory.

13. A non-transitory computer-readable data medium that includes instructions that, when executed by a processor of an electronic device, perform a method comprising:
   storing, in a first ROM-type memory of the electronic device, a plurality of security check instructions configured to cause performance of one or more security checks of the electronic device, the plurality of security check instructions being in a deactivated state and enabling personalization of the electronic device;
   receiving an instruction command including identifiers identifying two or more security check instructions of the plurality of security check instructions;
   concatenating the identifiers to create a code defining a set of instructions, wherein said set of instructions comprises the two or more security check instructions;
   storing the code in a second memory of the electronic device accessed by a program executed by the electronic device, wherein the program checks a transaction by executing the set of instructions defined by the code.

14. An electronic device comprising:
   a processor;
   a first ROM-type memory;
   a second memory;
   a non-transitory computer-readable medium storing instructions that when executed by the processor cause the processor to perform operations comprising:
   storing, in a first ROM-type memory of the electronic device, a plurality of security check instructions configured to cause performance of one or more security checks of the electronic device, the plurality of security check instructions being in a deactivated state and enabling personalization of the electronic device;
   receiving an instruction command including identifiers identifying two or more of the security check instructions;
   concatenating the received identifiers to create a code defining a set of instructions, wherein said set of instructions comprises the two or more security check instructions; and
   storing the code in a second memory of the electronic device accessed by a program executed by the electronic device, wherein the program checks a transaction by executing the set of instructions defined by the code.

* * * * *